United States Patent
Mills et al.

(10) Patent No.: US 9,368,928 B2
(45) Date of Patent: Jun. 14, 2016

(54) CIRCUIT BREAKER ADAPTOR FOR PLUG-IN CIRCUIT BREAKER PANEL

(71) Applicant: Labinal, LLC, Denton, TX (US)

(72) Inventors: Patrick Wellington Mills, Bradenton, FL (US); Richard George Benshoff, Sarasota, FL (US); James Michael McCormick, Bradenton, FL (US)

(73) Assignee: Labinal, LLC, Denton, TX (US)

( * ) Notice: Subject to any disclaimer, the term of this patent is extended or adjusted under 35 U.S.C. 154(b) by 0 days.

(21) Appl. No.: 14/390,038

(22) PCT Filed: Mar. 15, 2013

(86) PCT No.: PCT/US2013/031852
§ 371 (c)(1),
(2) Date: Oct. 2, 2014

(87) PCT Pub. No.: WO2013/151740
PCT Pub. Date: Oct. 10, 2013

(65) Prior Publication Data
US 2015/0079854 A1    Mar. 19, 2015

Related U.S. Application Data

(60) Provisional application No. 61/621,206, filed on Apr. 6, 2012.

(51) Int. Cl.
| | |
|---|---|
| *H02B 1/056* | (2006.01) |
| *H02B 11/04* | (2006.01) |
| *H02B 1/044* | (2006.01) |
| *H01R 31/06* | (2006.01) |

(Continued)

(52) U.S. Cl.
CPC ............ *H01R 31/06* (2013.01); *H01R 4/02* (2013.01); *H01R 4/30* (2013.01); *H01R 13/03* (2013.01); *H02B 1/056* (2013.01)

(58) Field of Classification Search
CPC ........ H02B 1/056; H02B 11/04; H02B 1/044; H02B 1/0565; H02B 1/04; H01R 9/2425; H01R 12/585; H01H 85/56; H01H 85/306; H02H 3/046
USPC .................. 361/634, 652, 656, 636, 673, 640
See application file for complete search history.

(56) References Cited

U.S. PATENT DOCUMENTS 5,439,396 A * 8/1995 Magdaleno ............ H01H 71/08
361/673
6,317,311 B1  11/2001 Middlehurst
(Continued)

FOREIGN PATENT DOCUMENTS

| DE | 19515923 | 11/1996 |
| EP | 0748018 | 12/1996 |
| GB | 2034984 | 6/1980 |

*Primary Examiner* — Amy Cohen Johnson
*Assistant Examiner* — Matthew T Dzierzynski
(74) *Attorney, Agent, or Firm* — Rankin, Hill & Clark LLP

(57) ABSTRACT

An adaptor (44, 70) mating a non-plug-in type circuit breaker (42) to a bus structure (14, 64) of a plug-in breaker panel (40, 62) includes a first portion (48, 72) coupled to a terminal (46) of the non-plug-in type circuit breaker (42) and an opposite second portion (50, 74) engaging a portion (24, 66) of the bus structure (14, 64). The first portion is formed from a first conductive material and the opposite second portion is formed from a second conductive material. The firs portion and the second portion form a conductive pathway between the terminal (46) of the non-plug-in type circuit breaker (42) and the portion (24, 66) of the bus structure (14).

9 Claims, 3 Drawing Sheets

(51) Int. Cl.
    *H01R 4/02*     (2006.01)
    *H01R 4/30*     (2006.01)
    *H01R 13/03*     (2006.01)

(56) References Cited

U.S. PATENT DOCUMENTS

| | | | |
|---|---|---|---|
| 6,784,783 B2 * | 8/2004 | Scoggin | H01H 85/547 337/194 |
| 7,027,293 B2 * | 4/2006 | Yang | H02B 1/205 200/50.27 |
| 7,049,973 B2 * | 5/2006 | Torrez | H01H 85/306 340/638 |
| 8,094,436 B2 * | 1/2012 | Mills | H02B 1/056 361/634 |
| 2002/0062986 A1 | 5/2002 | Lopp | |

\* cited by examiner

CIRCUIT BREAKER ADAPTOR FOR PLUG-IN CIRCUIT BREAKER PANEL

CROSS-REFERENCE TO RELATED APPLICATION

This application claims the benefit of U.S. Provisional Patent Application Ser. No. 61/621,206, filed Apr. 6, 2012, entitled "UNIVERSAL ADAPTOR FOR PLUG-IN CIRCUIT BREAKER," which is incorporated by reference herein.

BACKGROUND

1. Field

The disclosed concept pertains generally to plug-in circuit breaker panels and, more particularly, to an adaptor for mating a non-plug in type circuit breaker to a plug-in circuit breaker panel. The disclosed concept also relates to a plug-in circuit breaker assembly and a plug-in circuit breaker panel including such adaptor.

2. Background Information

Circuit breakers are used, for example, in aircraft electrical systems where they not only provide overcurrent protection but also serve as switches for turning equipment on and off. Aircraft or subminiature circuit breakers, for instance, are typically relatively small to accommodate the relatively high-density layout of aircraft circuit breaker panels, which make circuit breakers for numerous circuits accessible to a user. Aircraft electrical systems can consist, for example, of hundreds of circuit breakers, each of which is used for a circuit protection function as well as a circuit disconnection function through a push-pull handle.

The circuit breaker push-pull handle is moved from in-to-out in order to open the corresponding load circuit. This action may be either manual or, else, automatic in the event of an overload or fault condition. If the push-pull handle is moved from out-to-in, then the load circuit is re-energized. If the load circuit had been automatically de-energized, then the out-to-in operation of the push-pull handle corresponds to a circuit breaker reset action.

Plug-in circuit breaker panels, such as described in U.S. Pat. No. 8,094,436 for example, typically utilize an arrangement such as shown in FIG. 1. In such a panel 10, of which only a portion is shown in FIG. 1, a plug-in type circuit breaker 12 is secured between a bus structure 14 and a faceplate 16 which are both secured to a frame or housing (not shown). Each plug-in type circuit breaker 12 generally includes a first surface 18 which is engaged (either directly, as shown, or indirectly) by the faceplate 16, a manual operator 20 (e.g., without limitation, a push-pull operating handle) disposed from the first surface 18 and extending through an aperture 21 of the faceplate 16, and a pair of plug-in members 22 disposed opposite the first surface 18. In some applications, such as the example shown in the end view of the breaker 12 in FIG. 2, the plug-in members 22 may be generally aligned with respect to the breaker 12, while in other examples (not shown), the plug-in members 22 may be offset with respect to each other and or the breaker 12.

Each of the second plug-in members 22 of each circuit breaker 12 are mated with a corresponding one of first plug-in members 24 (shown in hidden line) of bus structure 14. Each second plug-in member 22 and the mated corresponding first plug-in member 24 cooperate to provide one of a power input (e.g., line) to, or a load output (e.g., load) from, the corresponding circuit breaker 12 via the electrical bus structure 14. The power input can be, for example, a single phase AC input or a single DC input. Alternatively, the power input can be, for example, a three-phase AC input.

The plug-in arrangement of such panels 10 makes them particularly suitable for aerospace (e.g., aircraft) electrical systems and other applications where space for, and access to, such panels are limited. However, as such panels 10 are particularly designed for use with plug-in circuit breakers 12, availability and selection of such breakers can be a limiting factor in the use of such panels in particular applications.

There is thus room for improvement in plug-in circuit breaker panels and circuit breakers therefore.

SUMMARY

These needs and others are met by embodiments of the disclosed concept, which provide an adaptor for mating a non-plug-in type circuit breaker to a plug-in type circuit breaker panel and a breaker panel including a non-plug-in type breaker and such an adaptor. Among other benefits, the disclosed concept provides flexibility in the selection of circuit breakers for a particular application to enable catering of breaker performance to the application.

As one aspect of the disclosed concept, an adaptor for use mating a non-plug-in type circuit breaker to a bus structure of a plug-in breaker panel is provided. The adaptor comprises: a first portion structured to be coupled to a terminal of the non-plug-in type circuit breaker and an opposite second portion structured to cooperatively engage a portion of the bus structure. The first portion is formed from a first conductive material and the opposite second portion is formed from a second conductive material. The first conductive material and the second conductive material are structured to form a conductive pathway between the terminal of the non-plug-in type circuit breaker and the portion of the bus structure.

The first portion may be structured to be mechanically fastened to the terminal of the non-plug-in type circuit breaker.

The first portion may be structured to be soldered to the terminal of the non-plug-in type circuit breaker.

The first conductive material may comprise a copper alloy or other suitable conductive material.

The second conductive material may comprise a copper alloy or other suitable conductive material.

The first conductive material and the second conductive material may comprise the same conductive material.

The first conductive material and the second conductive material may comprise different portions of the same unitary piece of conductive material.

The portion of the bus structure may comprise a socket and the opposite second portion of the adaptor may comprise a plug-in member structured to cooperatively engage the socket thereabout.

The portion of the bus structure may comprise a plug-in member and the opposite second portion of the adaptor may comprise a socket structured to cooperatively engage the plug-in member therein.

As another aspect of the disclosed concept a plug-in circuit breaker assembly is provided. The plug-in circuit breaker assembly comprises a non-plug-in type circuit breaker and an adaptor as described above, wherein the first portion of the adaptor is coupled to a terminal of the non-plug-in type circuit breaker.

As yet another aspect of the disclosed concept, a plug-in circuit breaker panel is provided. The plug-in circuit breaker panel comprises a bus structure and a plug in circuit breaker assembly as described above, wherein the opposite second portion of the adaptor of the circuit breaker assembly is cooperatively engaged with a portion of the bus structure.

These and other objects, features, and characteristics of the disclosed concept, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed concept.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "fastener" refers to any suitable connecting or tightening mechanism expressly including, but not limited to, screws, bolts, nuts (e.g., without limitation, lock nuts) and combinations thereof.

As employed herein, the term "plug-in type circuit breaker" shall be used to refer to any circuit breaker that employs a "pin and socket" or other similar mechanism for electrically coupling a breaker or other switching mechanism to a plug-in circuit breaker panel.

As employed herein, the term "non-plug-in type circuit breaker" shall be used to refer to any circuit breaker that is not particularly designed for use in a plug-in circuit breaker panel. Examples of "non-plug-in type circuit breakers" include, without limitation, MILSpec and conventional configuration breakers which use a screw and lock-washer to attach a wire to a lug or terminal on the breaker.

The disclosed concept is described in association with subminiature or aircraft circuit breaker panels, although the disclosed concept is applicable to a wide range of different circuit breaker panels for a wide range of different applications as well as applicable to other electrical switching apparatus (e.g., without limitation, switches, interrupters, contactors) employed in similar panels. Such circuit breaker panels can be employed, for example and without limitation, in aircraft alternating current (AC) electrical systems having a typical frequency of about 400 Hz, but can also be used in direct current (DC) systems. It will also become evident that the disclosed concept is applicable to other types of circuit breaker panels including those used in AC systems operating at other frequencies; to larger circuit breakers, such as miniature residential or commercial circuit breakers; and to a wide range of circuit breaker applications, such as, for example, without limitation, residential, commercial, industrial, aerospace, and automotive. As further non-limiting examples, both AC (e.g., without limitation, 120, 220, 480-600 VAC) operation at a wide range of frequencies (e.g., without limitation, 50, 60, 120, 400 Hz, and higher or lower frequencies) and DC operation (e.g., without limitation, 42 VDC) are possible.

Figure 1:
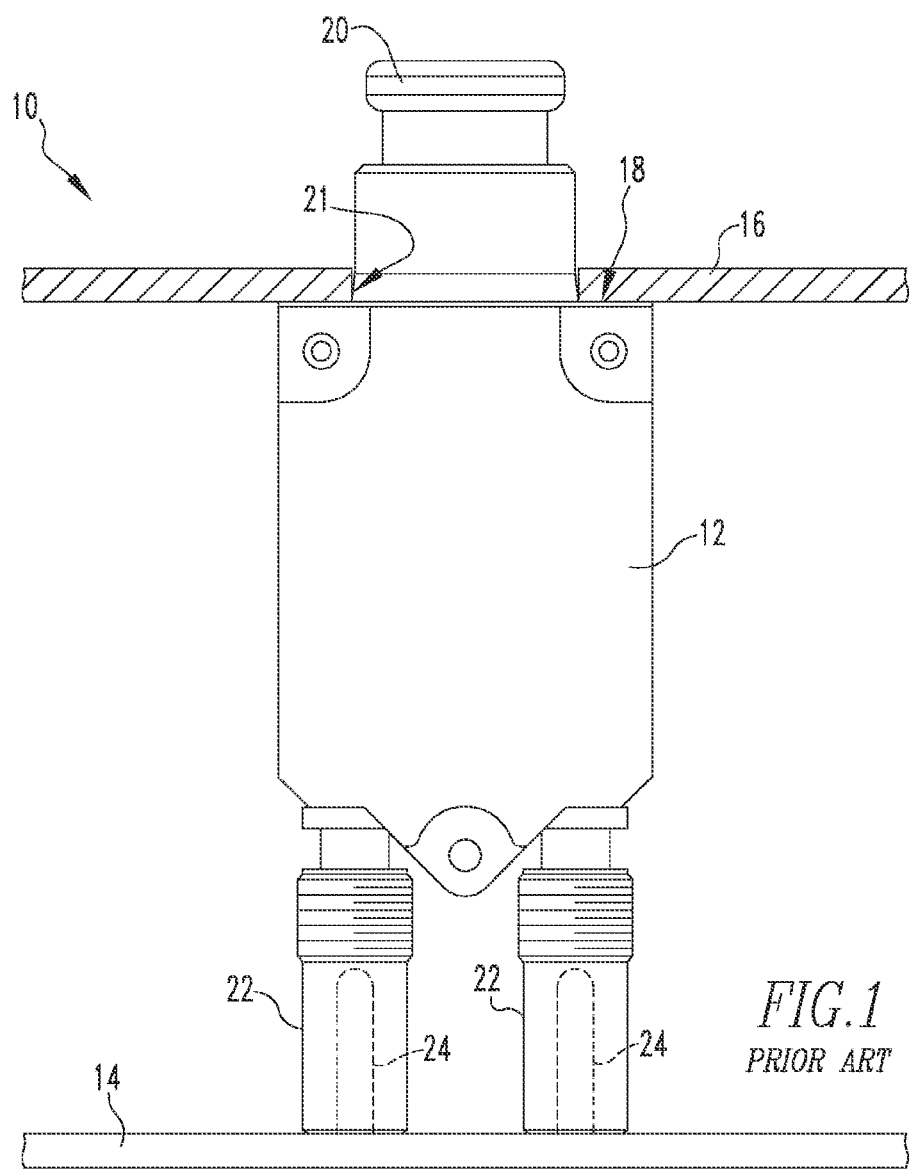
FIG. 1 is a schematic side view of a known plug-in circuit breaker shown disposed in a portion of a plug-in circuit breaker panel.
Figure 2:
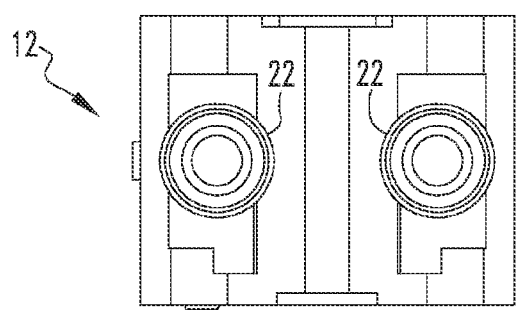
FIG. 2 is a schematic end view of the known plug-in circuit breaker of FIG. 1.
Figure 3:
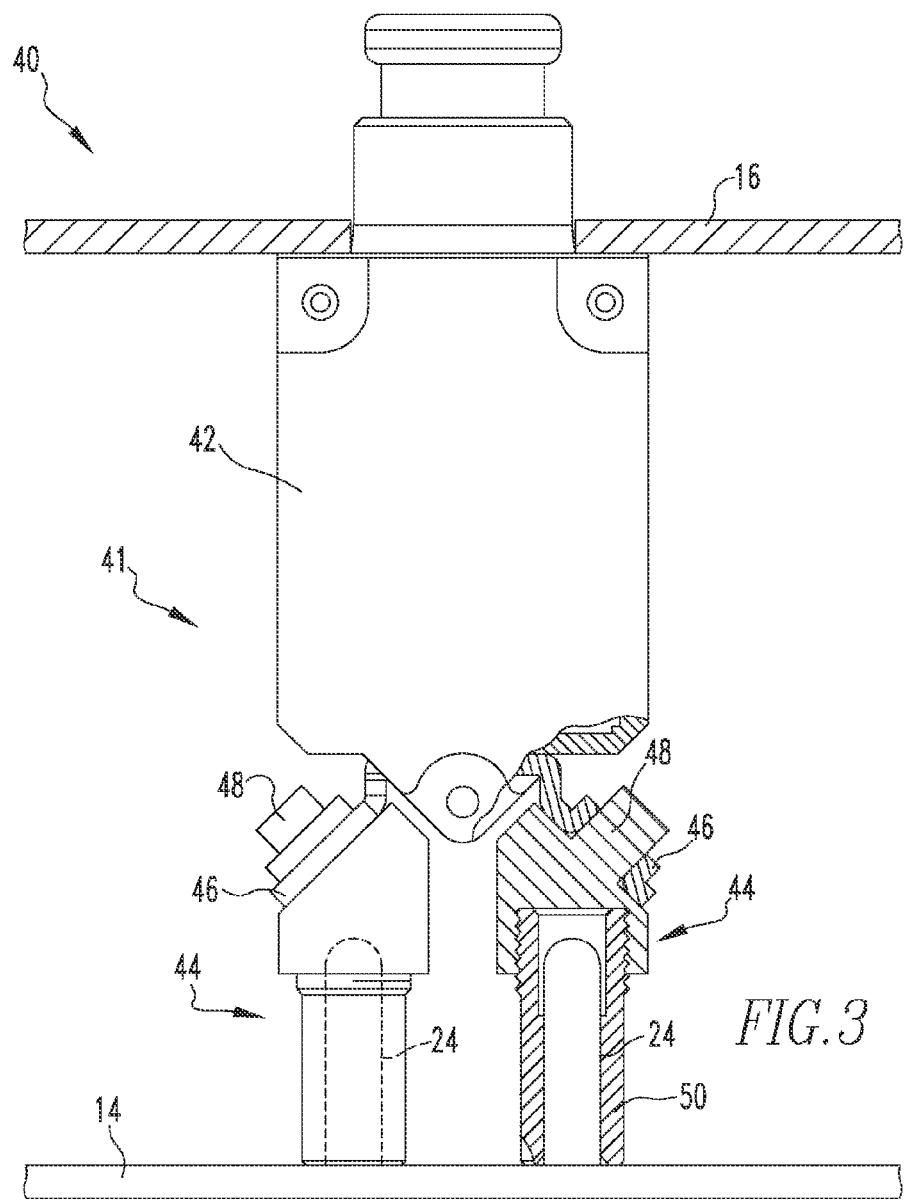
FIG. 3 is a schematic side view of a circuit breaker assembly including a non plug-in circuit breaker and adaptors in accordance with an embodiment of the disclosed concept disposed in a portion of a plug-in circuit breaker panel.
Figure 4:
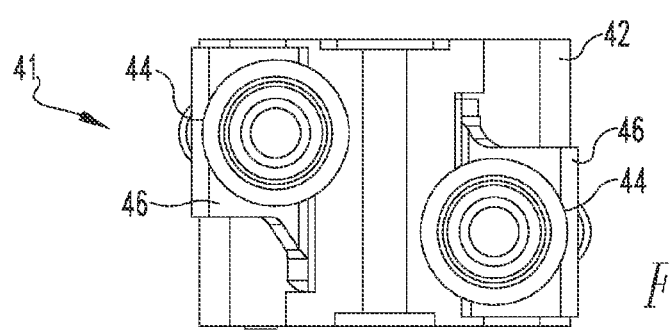
FIG. 4 is a schematic end view of the circuit breaker assembly of FIG. 3.

Referring to FIGS. 3 and 4 respectively, a portion of a plug-in circuit breaker panel 40 and an end view of a circuit breaker assembly 42 in accordance with an embodiment of the disclosed concept included in such panel 40 are shown. Similar to panel 10 previously discussed in regard to FIG. 1, panel 40 includes a bus structure 14 having a number of first plug-in members 24 extending therefrom and a faceplate 16 disposed generally parallel to the bus structure 14. Bus structure 14 and faceplate 16 are both secured to a frame or housing (not shown). However, unlike panel 10 which included a plug-in type circuit breaker 12, panel 40 includes a circuit breaker assembly 41 having a non-plug-in type circuit breaker 42 and a plurality of adaptors 44 which electrically couple breaker 42 to the bus structure 14. More particularly, each adaptor 44 provides an electrical pathway between a respective terminal 46 of the breaker 42 and a first plug-in member 24 of the bus structure 14. Although breaker 42 is shown as having a pair of flat terminals 46, it is to be appreciated that other breaker sizes and/or arrangements may be employed without varying from the scope of the disclosed concept. For example, without limitation, although shown in the end view of FIG. 4 as being staggered, it is to be appreciated that such example embodiment could be readily employed with the aligned arrangement previously described in conjunction with FIGS. 1 and 2 by simply offsetting one or more portions of the adaptor(s) 44 described further below.

Continuing to refer to FIG. 3, each adaptor 44 includes a first portion 48 structured to be coupled to one of the terminals 46 of the non-plug-in type circuit breaker 42 and an opposite second portion 50 structured to cooperatively engage a portion of the bus structure, such as the post or first plug-in member 24. As shown in a sectioned portion of FIG. 3, second portion 50 is formed generally as a socket member which cooperatively engages the post-like plug-in member 24 of the bus structure 14. First portion 48 may be formed from a suitable conductive material (e.g., without limitation, copper) and may be coupled to a terminal 46 of breaker 42 via any suitable means such as, for example, without limitation, a mechanical fastener or soldering. Second portion 50 may be formed from the same material as the first portion 48 or may be formed from a different suitable conductive material (e.g., without limitation, copper, beryllium copper). In use, the conductive materials of the first and second portions 48 and 50 form a conductive pathway between the terminal 46 of the non-plug-in type circuit breaker 42 and the first plug-in member 24 of the bus structure 14.

Figure 5:
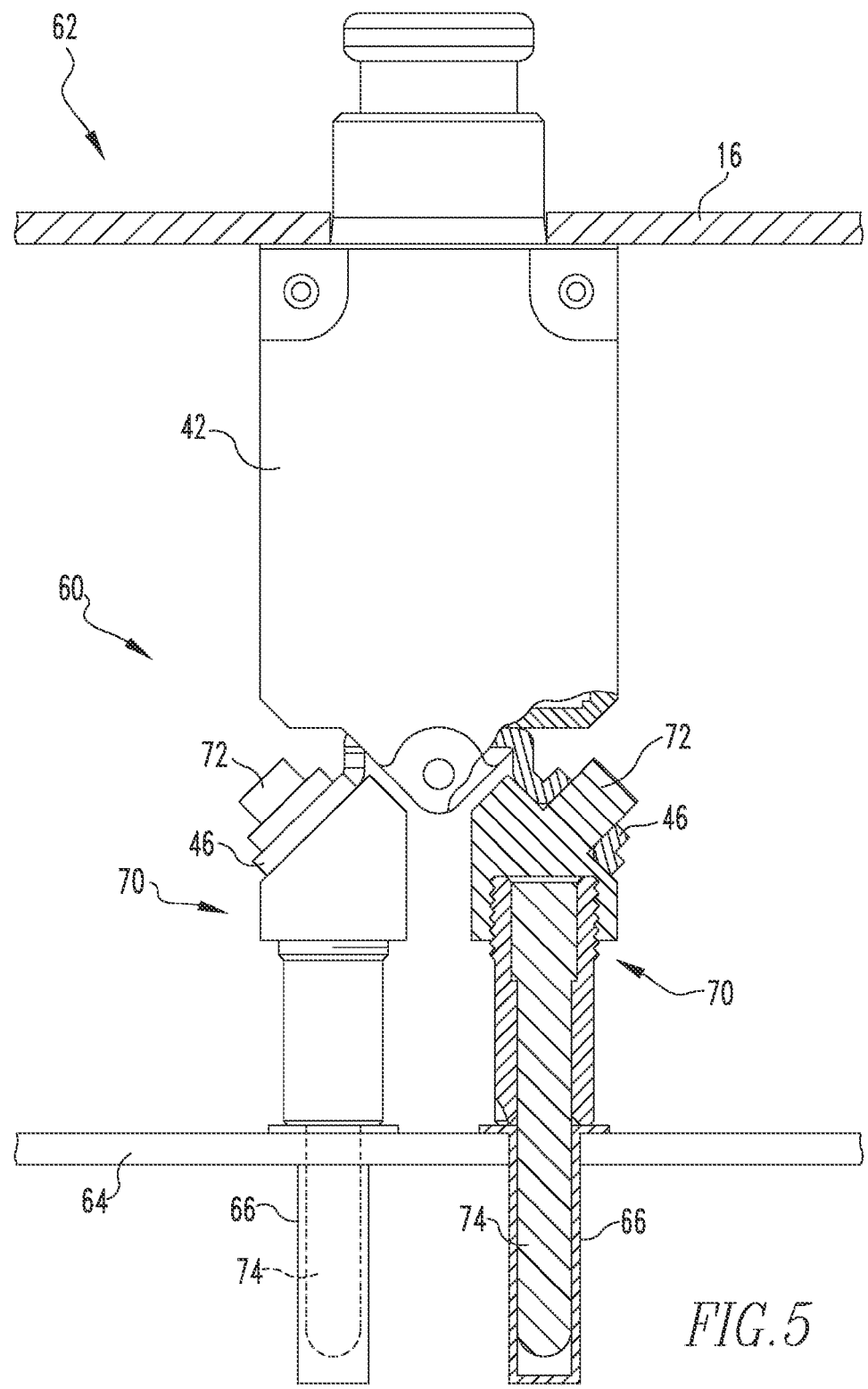
FIG. 5 is a schematic side view of a circuit breaker assembly including a non plug-in circuit breaker and adaptors in accordance with another embodiment of the disclosed concept disposed in a portion of another plug-in circuit breaker panel.

Another example of a plug-in circuit breaker assembly 60 in accordance with another embodiment of the disclosed concept is shown in FIG. 5. More particularly, FIG. 5 shows a portion of another plug-in circuit breaker panel 62 which is of generally similar design as panels 10 and 40 previously discussed, and as such includes a non-plug-in circuit breaker 42 disposed between a faceplate 16 and a bus structure 64. However, unlike the bus structure 14 of panels 10 and 40, the bus structure 64 of panel 62 includes a number of sockets 66 in place of the post-like first plug-in members 24 previously discussed. In order to electrically couple each of the terminals 46 of the breaker 42 to such sockets 66, breaker assembly 60 includes a number of adaptors 70.

Continuing to refer to FIG. 5, each adaptor 70 includes a first portion 72 formed from a suitable conductive material (e.g., without limitation, copper) which is structured to be coupled to one of the terminals 46 of the non-plug-in type circuit breaker 42 in a similar manner as described in regard to the embodiment of FIGS. 3 and 4. Each adaptor 70 further includes an opposite second portion 74 structured to cooperatively engage a respective one of the sockets 66 of the bus structure 64. As shown in a sectioned portion of FIG. 5, second portion 74 is formed generally as a post-like plug in member which cooperatively engages an inner portion (not numbered) of socket 66. Second portion 50 may be formed from the same material as the first portion 48 or may be formed from a different suitable conductive material (e.g., without limitation, copper, beryllium copper). In use, the conductive materials of the first and second portions 72 and 74 form a conductive pathway between the terminal 46 of the non-plug-in type circuit breaker 42 and the socket 66 of the bus structure 64.

While specific embodiments of the disclosed concept have been described in detail, it will be appreciated by those skilled in the art that various modifications and alternatives to those details could be developed in light of the overall teachings of the disclosure. For example, without limitation, it is foreseeable that one or more of the size and shape of one or both portions of the adaptors described herein may readily be varied to cooperatively engage with the corresponding portions of other styles/models of non-plug-in breakers and bus structures from those particularly described herein. Although particularly described herein in connection with circuit breakers, it is to be appreciated that the disclosed concept may be readily applied to other electrical switching apparatus such as, for example, without limitation, switches, interrupters, contactors, etc. without varying from the scope of the disclosed concept. Accordingly, the particular arrangements disclosed are meant to be illustrative only and not limiting as to the scope of the disclosed concept which is to be given the full breadth of the claims appended and any and all equivalents thereof.

What is claimed is:

1. An adaptor for use mating a non-plug-in type circuit breaker to a bus structure of a plug-in breaker panel, the adaptor comprising:
   a first portion structured to be coupled to a terminal of the non-plug-in type circuit breaker, the first portion being formed from a first conductive material; and
   an opposite second portion structured to cooperatively engage a portion of the bus structure the opposite second portion being formed from a second conductive material,
   wherein the first portion and the opposite second portion are structured to form a conductive pathway between the terminal of the non-plug-in type circuit breaker and the portion of the bus structure, and
   wherein the opposite second portion of the adaptor comprises a socket structured to cooperatively receive a plug-in member of the portion of the bus structure therein.

2. The adaptor of claim 1 wherein the first portion is structured to be mechanically fastened to the terminal of the non-plug-in type circuit breaker.

3. The adaptor of claim 1 wherein the first portion is structured to be soldered to the terminal of the non-plug-in type circuit breaker.

4. The adaptor of claim 1 wherein the first conductive material comprises a copper alloy.

5. The adaptor of claim 1 wherein the second conductive material comprises a copper alloy.

6. The adaptor of claim 1 wherein the first conductive material and the second conductive material are the same conductive material.

7. The adaptor of claim 1 wherein the first conductive material and the second conductive material are different portions of the same unitary piece of conductive material.

8. A plug-in circuit breaker assembly comprising:
   a non-plug-in type circuit breaker; and
   an adaptor as recited in claim 1,
   wherein the first portion of the adaptor is coupled to a terminal of the non-plug-in type circuit breaker.

9. A plug-in circuit breaker panel comprising:
   a bus structure and
   a plug in circuit breaker assembly as recited in claim 8,
   wherein the opposite second portion of the adaptor of the circuit breaker assembly is cooperatively engaged with a portion of the bus structure.

* * * * *